US012572166B2

(12) United States Patent
Van Oven et al.

(10) Patent No.: US 12,572,166 B2
(45) Date of Patent: Mar. 10, 2026

(54) CONTROLLING A NETWORK OF DATA PROCESSING DEVICES FOR A QUANTUM COMPUTER

(71) Applicant: Qblox B.V., Delft (NL)

(72) Inventors: Jules Christiaan Van Oven, Delft (NL); Jordy Marinus Josephus Gloudemans, Delft (NL); Cornelis Christiaan Bultink, Delft (NL)

(73) Assignee: Qblox B.V., Delft (NL)

( * ) Notice: Subject to any disclaimer, the term of this patent is extended or adjusted under 35 U.S.C. 154(b) by 0 days.

(21) Appl. No.: 18/263,586

(22) PCT Filed: Feb. 3, 2022

(86) PCT No.: PCT/NL2022/050053
§ 371 (c)(1),
(2) Date: Jul. 31, 2023

(87) PCT Pub. No.: WO2022/169360
PCT Pub. Date: Aug. 11, 2022

(65) Prior Publication Data
US 2024/0085943 A1 Mar. 14, 2024

(30) Foreign Application Priority Data
Feb. 3, 2021 (NL) ..................................... 2027492

(51) Int. Cl.
*G06F 1/12* (2006.01)
*G06N 10/80* (2022.01)

(52) U.S. Cl.
CPC .............. *G06F 1/12* (2013.01); *G06N 10/80* (2022.01)

(58) Field of Classification Search
CPC .... G06F 1/10; G06F 1/12; G06F 1/14; G06N 10/80; G06N 10/40; G06N 10/70
See application file for complete search history.

(56) References Cited

U.S. PATENT DOCUMENTS

| | | |
|---|---|---|
| 6,370,200 B1 | 4/2002 | Takahashi |
| 2007/0223632 A1 | 9/2007 | Boskovic et al. |

(Continued)

FOREIGN PATENT DOCUMENTS

| | | |
|---|---|---|
| JP | H07-336379 A | 12/1995 |
| WO | 2020197396 A1 | 10/2020 |

OTHER PUBLICATIONS

International Search Report and Written Opinion in corresponding International application No. PCT/NL2022/050053 dated May 27, 2022.

(Continued)

*Primary Examiner* — Raymond N Phan
(74) *Attorney, Agent, or Firm* — Steven M. Koehler; Westman, Champlin & Koehler, P.A.

(57) ABSTRACT

A method for controlling data transmission in a hierarchical network, preferably a star network, of data processing devices, the data processing devices including controllers, e.g. quantum controllers, and a distributor, wherein the method comprises: receiving, by the distributor, a reference clock signal for synchronizing clocks of the data processing devices in the network; synchronizing, by the distributor, a clock of the distributor based on the reference clock signal, so that the clock of the distributor is synchronized with the clocks of the controllers; and, controlling, by the distributor, time-delayed transmission of a data message to at least part of the controllers so that the transmitted data messages simultaneously arrive at the controllers, the time-delayed transmission being based on a delay schedule including information about propagation delays associated with point-to-point connections between the distributor and the controllers.

19 Claims, 11 Drawing Sheets

(56)  References Cited

U.S. PATENT DOCUMENTS

| | | | |
|---|---|---|---|
| 2021/0026162 A1 | 1/2021 | Apisdorf et al. | |
| 2022/0179445 A1 | 6/2022 | Vlothuizen | |
| 2022/0368429 A1* | 11/2022 | Sivan | G06N 10/70 |
| 2022/0398099 A1* | 12/2022 | Willenborg | G06N 10/00 |

OTHER PUBLICATIONS

Diadamo et al. "Distributed Quantum Computing and Network Control for Accelerated VQE", Transactions on Quantum Engineering, Jan. 8, 2021, 40 pages.
Merario, S. "QuTech Central Controller: A Quantum Control Architecture for a Surface-17 Logical Qubit", Delft University of Technology, May 2019, 96 pages.
Office Action in corresponding Japanese Patent Application Serial No. 2023-546357 dated Dec. 16, 2025.

* cited by examiner

100

104

$102_{1-n}$ pulse sequence
generator

106

DAC
s 108 processor

116 memory

114 clock

118 data
analyser

112

ADC
s
110

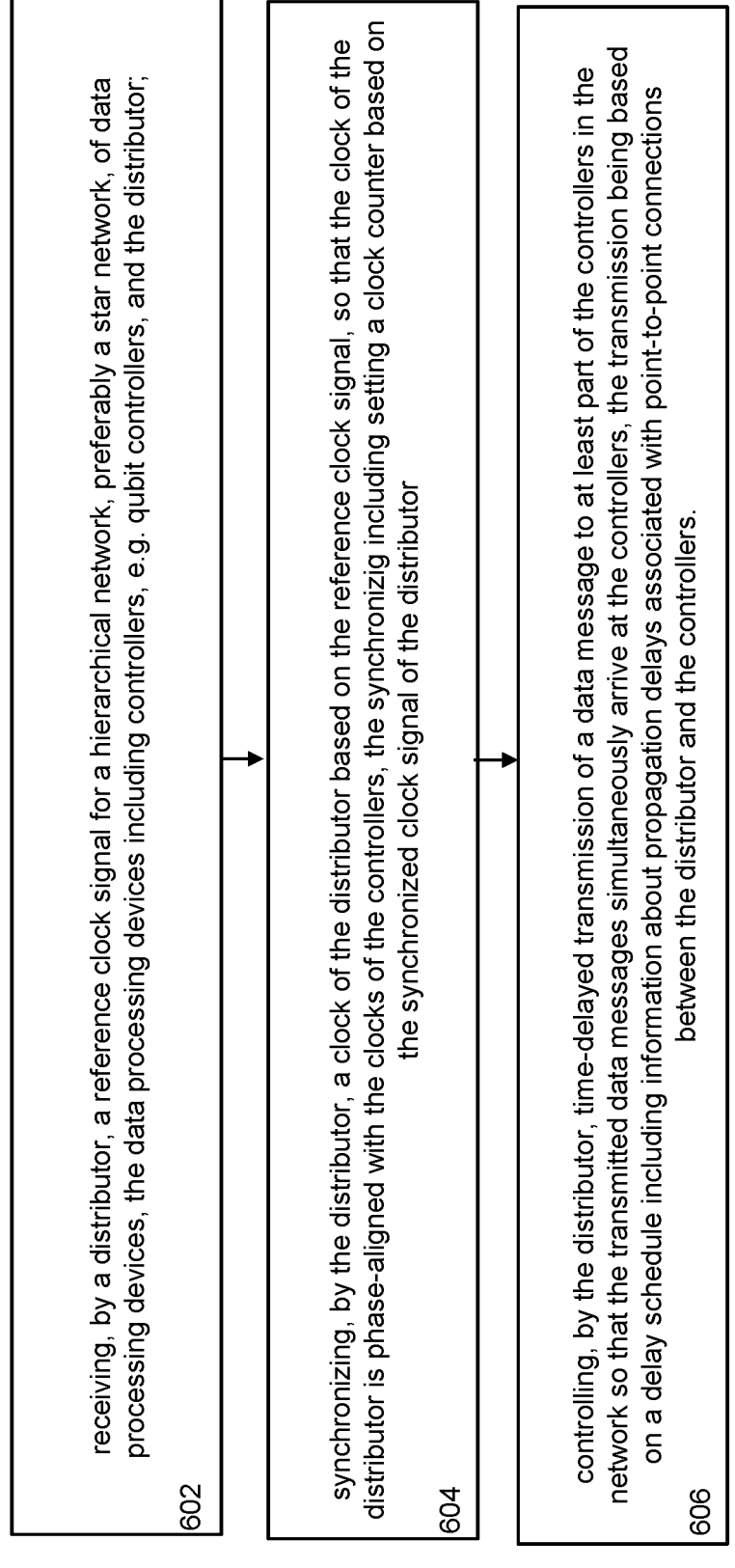

receiving, by a distributor, a reference clock signal for a hierarchical network, preferably a star network, of data processing devices, the data processing devices including controllers, e.g. qubit controllers, and the distributor;

602 synchronizing, by the distributor, a clock of the distributor based on the reference clock signal, so that the clock of the distributor is phase-aligned with the clocks of the controllers, the synchronizig including setting a clock counter based on the synchronized clock signal of the distributor

604 controlling, by the distributor, time-delayed transmission of a data message to at least part of the controllers in the network so that the transmitted data messages simultaneously arrive at the controllers, the transmission being based on a delay schedule including information about propagation delays associated with point-to-point connections between the distributor and the controllers.

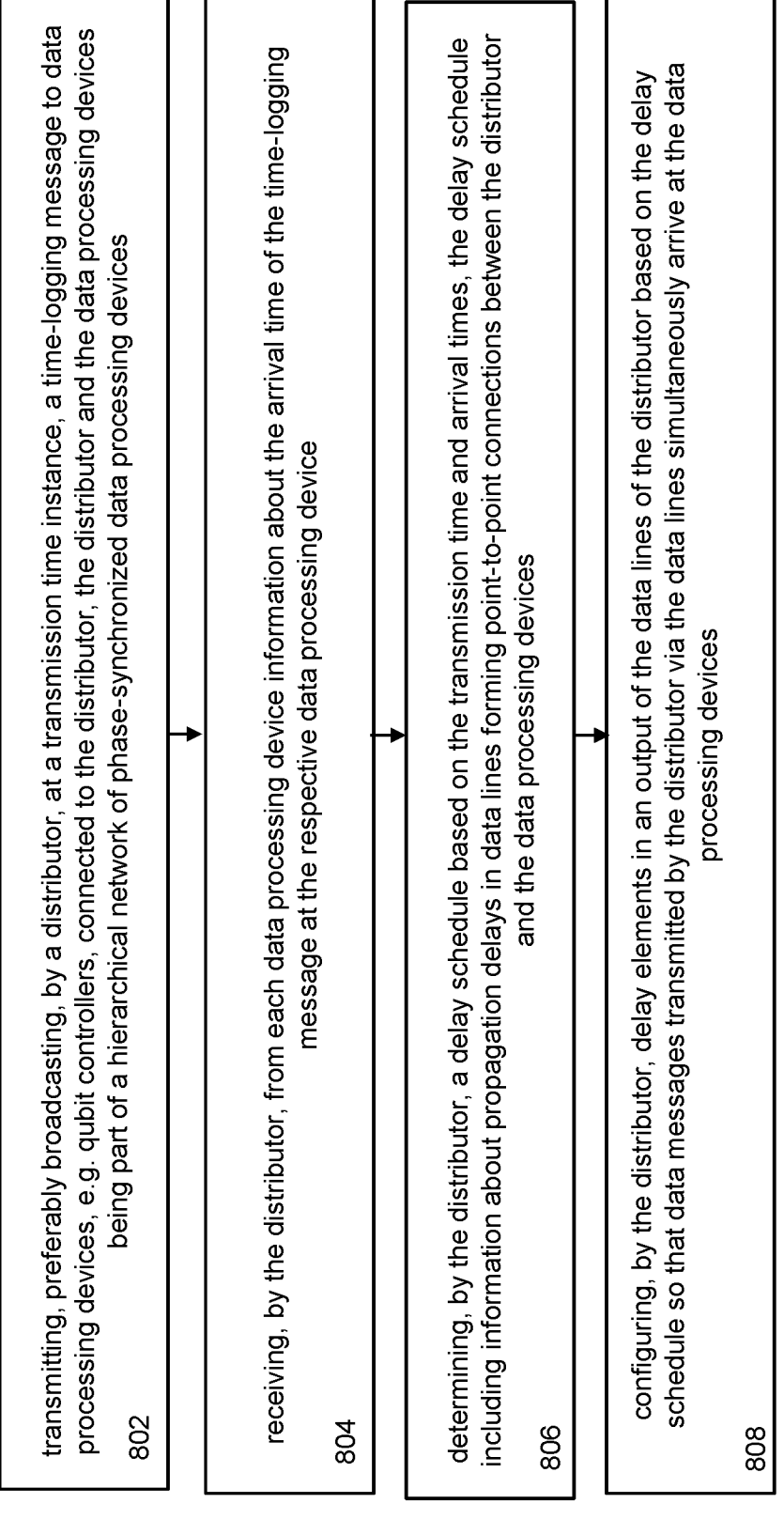

transmitting, preferably broadcasting, by a distributor, at a transmission time instance, a time-logging message to data processing devices, e.g. qubit controllers, connected to the distributor, the distributor and the data processing devices being part of a hierarchical network of phase-synchronized data processing devices

802 receiving, by the distributor, from each data processing device information about the arrival time of the time-logging message at the respective data processing device

804 determining, by the distributor, a delay schedule based on the transmission time and arrival times, the delay schedule including information about propagation delays in data lines forming point-to-point connections between the distributor and the data processing devices

806 configuring, by the distributor, delay elements in an output of the data lines of the distributor based on the delay schedule so that data messages transmitted by the distributor via the data lines simultaneously arrive at the data processing devices

CONTROLLING A NETWORK OF DATA PROCESSING DEVICES FOR A QUANTUM COMPUTER

CROSS-REFERENCE TO RELATED APPLICATION(S)

The present application is a Section 371 National Stage Application of International Application No. PCT/NL2022/050053, filed Feb. 3, 2022 and published as WO 2022/169360 A1 on Aug. 11, 2022, and further claims priority to Netherlands patent application no. 2027492, filed Feb. 3, 2021.

TECHNICAL FIELD

The embodiments relate to controlling a network of data processing devices, preferably a network of controllers for a quantum computer, and, in particular, though not exclusively, to methods and systems for managing a network of data processing devices and a computer program product for executing such methods.

BACKGROUND

Quantum systems require a classical control system to manipulate and readout quantum circuits, e.g. arrays of qubits. Such a control system is configured to generate carefully timed high-frequency pulses for readout and control. For scalability, the control system is distributed along many modules, e.g. quantum controllers, that each can run independently and control or readout the state of one or a set of the qubits in the array of qubits. Due to the stringed timing requirements, such a quantum controller is typically for a large part implemented as a digital circuit such as an application-specific integrated circuit (ASIC), a field-programmable gate array (FPGA) or a special-purpose processor. In such a control system, full control over relative timing between the signals of the different modules is very important, because during the execution of a quantum algorithm, execution of specific tasks by the modules could be conditional on information that is being exchanged between the modules or between modules and the quantum computer.

Once started, modules may execute tasks of known duration, i.e. tasks that behave deterministically, to maintain alignment of pulses. Sometimes however, a module has to execute a task of unknown duration. For example, US1055055524 describes a distributed set of quantum controllers which are adapted to perform a qubit operation of an unknown duration, for example a repeat-until-success type of reset operation of a qubit. In such a case, to prevent losing synchronicity between the modules during the execution of a quantum algorithm, modules need to wait until the module that executes a quantum operation with an unknown duration is finished. Once the module has performed its task and is ready to proceed, it informs all other modules that it is ready. The modules are only allowed to update their own status and evaluate the readiness of the other modules on a slow periodic grid of which one period is equal or longer than the longest difference between point-to-point transfer times observed in the system. This ensures that all information is updated on all modules at the moment of evaluation.

The disadvantage of such an approach is that if a module has become ready a fraction of time after the slow periodic grid point, it has to wait until the next grid point before it is allowed to send its status to the other modules. Because qubits are very sensitive to environmental noise and therefore have a very limited lifetime, this additional latency results in increased error rates and is therefore highly undesirable. Hence, from the above it follows that there is a need in the art for improved control of a network of data processing devices, such as quantum controllers, that allows execution of quantum operations of unknown duration when exchanging information between modules and that is guaranteed without the need for status updates and evaluation on a slow time grid.

SUMMARY

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Functions described in this disclosure may be implemented as an algorithm executed by a microprocessor of a computer. Furthermore, aspects of the present invention may take the form of a computer program product embodied in one or more computer readable medium(s) having computer readable program code embodied, e.g., stored, thereon.

The methods, systems, modules, functions and/or algorithms described with reference to the embodiments in this application may be realized in hardware, software, or a combination of hardware and software. The methods, systems, modules, functions and/or algorithms may be realized in a centralized fashion in at least one computing system, or in a distributed fashion where different elements are spread across several interconnected computing systems. Any kind of computing system or other apparatus adapted for carrying out the embodiments (or parts thereof) described in this application is suited. A typical implementation may comprise one or more digital circuits such as application specific integrated circuits (ASICs), one or more field programmable gate arrays (FPGAs), and/or one or more processors (e.g., x86, x64, ARM, PIC, and/or any other suitable processor architecture) and associated supporting circuitry (e.g., storage, DRAM, FLASH, bus interface circuits, etc.). Each discrete ASIC, FPGA, processor, or other circuit may be referred to as "chip," and multiple such circuits may be referred to as a "chipset." In an implementation, the programmable logic devices may be provided with fast RAM, in particular block RAM (BRAM). Another implementation may comprise a non-transitory machine-readable (e.g., computer readable) medium (e.g., FLASH drive, optical disk, magnetic storage disk, or the like) having stored thereon one or more lines of code that, when executed by a machine, cause the machine to perform processes as described in this disclosure.

The flowcharts and block diagrams in the figures may represent architecture, functionality, and operation of possible implementations of the methods, systems and/or modules to various embodiments of the present invention. In this regard, each block in a flowchart or a block diagram may represent a module, segment, or portion of code, which be implemented as software, hardware or a combination of software and hardware.

It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

The embodiments in this application describe methods and systems for deterministic low-latency data exchange within a distributed network of data-processing devices, e.g. quantum controllers that form a control stack for a quantum computer. Such data exchange is needed in case the operation of different controllers in the distributed network, e.g. a star network, are conditional on information that is exchanged between controllers (for example qubit measurement results). This information needs to be available at all controllers simultaneously.

In a first aspect, the invention may relate to a method for controlling data transmission in a hierarchical network of data processing devices. In an embodiment, the method may comprise receiving, by a distributor, a reference clock signal for synchronizing clocks of the data processing devices in the network. The method may further comprise synchronizing, by the distributor, a clock of the distributor based on the reference clock signal, so that the clock of the distributor is phase-aligned with the clocks of the controllers. The method may also comprise controlling, by the distributor, time-delayed transmission of a data message to at least part of the controllers in the network so that the transmitted data messages simultaneously arrive at the controllers, the time-delayed transmission being based on a delay schedule including information about propagation delays associated with point-to-point connections between the distributor and the controllers.

In a further aspect, the invention may relate to a method for controlling data transmission in a hierarchical network, of data processing devices, the data processing devices including quantum controllers for controlling quantum elements of a quantum computer and a distributor communicatively connected to the quantum controllers, each of the quantum controllers being configured to send analog signals to the quantum computer and to process analog signals received from the quantum computer.

In an embodiment, the method may include receiving, by the distributor, a reference clock signal for synchronizing clocks of the data processing devices in the network; synchronizing, by the distributor, a clock of the distributor based on the reference clock signal, so that the clock of the distributor is synchronized with the clocks of the other data processing devices in the network; and, controlling, by the distributor, time-delayed transmission of a data message to the quantum controllers so that the data messages transmitted by the distributor within the same clock cycle arrive at at least part of the quantum the quantum controllers, the time-delayed transmission by the distributor being based on a delay schedule including information about propagation delays associated with point-to-point connections between the distributor and the quantum controllers.

The embodiments provide synchronous information exchange between the data processing devices in the network without the need for status updates and evaluation on a slow time grid known from the prior art. Here, the data processing devices include quantum controllers for controlling quantum elements of a quantum computer and a distributor communicatively connected to the quantum controllers, each of the quantum controllers being configured to send signals to the quantum computer and to process signals received from the quantum computer.

A quantum controller may include high-speed control electronics, e.g., FPGA-based electronics, for independently controlling quantum elements of the quantum computer, e.g. one or more qubits. The quantum elements may be controlled by sending an analog signal to the quantum computer. In an embodiment, the analog signal may include a predetermined sequence of high-frequency analog pulses. The quantum controller may comprise a pulse sequence generator for constructing a digital pulse sequence based on digital pulse signals stored in a memory and a digital-to-analog converter DAC for transforming the digital signal into an analog signal. Further, response signals, e.g. measurements representing a quantum state of a qubit, originating from the quantum computer may be digitized by an analog-to-digital converter ADC of the quantum controller. The quantum controller may further include a data analyzer for processing the response signals. The quantum controller may further include a processor, e.g. a CPU and a dock that is used for timing the processes executed by the controller. The quantum controller may be connected to a computer which may be configured to execute a computer program, e.g. a compiler, that is configured to translate a high-level program representing an algorithm to be executed on a quantum computer (a quantum algorithm) into instructions for the quantum controller. These instructions, which may be stored in a memory of the quantum controller, may represent a quantum circuit comprising a sequence of quantum gate operations.

The quantum controller may be configured to translate the instructions (e.g. quantum gate operations) into an analog signal, e.g. a sequence of analogue pulses for setting initial states of qubits, for letting qubits interact with each other and for readout end states of qubits. The instructions may be stored in the memory and independently executed by the processor of the quantum controller. During execution of the instructions by the quantum controllers, data received and/or processed by one quantum controller may be required as input for one or more other quantum controllers or other data processing devices. Hence, during execution of a quantum algorithm on a quantum computer by the quantum controllers, orchestrated and synchronized data distribution within the network of quantum controllers is needed.

To achieve this, the data processing devices are connected in a hierarchical network, such as an (extended) star network. If a data processing device wants to transmit a message to the other data processing device, the message is first sent to a so-called distributor, which forms the hub of the star network. The distributor may transmit the message to all data processing devices connected to it, including the data processing devices that initially sent the message. The distributor controls the transmission of the message to compensate for differences in transmission latencies, caused for example by varying cable lengths, by delaying the messages on each connection. Analogue or digital delay elements may be used to achieve these delays. These delay elements may be part of the distributor and/or external to the distributor, i.e. somewhere in the point-to-point connection, e.g. near the input side and/or the output side of a data line. This way, a message sent from one data processing device arrives simultaneously (i.e. at the same clock cycle) at the inputs of the data processing device connected to the distributor.

In an embodiment, controlling by the distributor may further include: receiving a first data message sent by a first controller in the network; and, transmitting the first data message to at least part of the controllers, preferably all controllers in the network, based on the delay schedule. Hence, in this embodiment, a message originating from one controller may be effectively transmitted to all the data processing devices, e.g. the controllers including the controller that sent the original message, such that they arrive at the controllers at substantially the same time instance, i.e. at a common clock count.

Including the originally sent data in the transmission by the distributor, all data processing devices, including the original sender of the message, receive the information simultaneously so that they can start further data processes in a synchronized way. As the method does not rely on sending messages on a particular time grid, it does not suffer from the disadvantages known from the prior art. The invention is especially useful for exchanging data in distributed quantum controllers where low-latency communication is essential. This method requires that delays through all data channels of the hierarchical network are carefully characterized. This may be easily achieved by measuring and comparing the arrival times of a message sent from the distributor to the modules in the system.

In an embodiment, the controlling by the distributor may further include: receiving a first data message from a first controller in the network, the first data message comprising one or more first data values; transmitting the first data message to a another data processing device in the network, the data processing device being configured to compute one or more second data values based on the one or more first data values; receiving a second data message from the data processing device comprising the one or more second data values; and, transmitting the second data message to the controllers, preferably all controllers in the network, based on the delay schedule. In this embodiment, the information carried in a message may be processed by a data processing device in the network before it is sent to all data processing devices In an embodiment, the data processing device may include a quantum error decoder and the one or more first data values includes error information associated with a logical qubit and the one or more second data values include error correction information for correcting at least one error associated with the logical qubit.

The invention is especially useful for distributing qubit measurement results to quantum controllers or distributing the results (the Pauli frame updates) of a quantum error decoder to quantum controllers. Another application may include resynchronization of modules after one or more modules have to perform tasks with an unknown duration, e.g. a reset of a qubit or the like.

In an embodiment, the controlling by the distributor further includes: setting delay buffers associated with the output of the distributor based on the information about propagation delays.

In an embodiment, the controlling by the distributor may further include: receiving a second data message sent by a second controller in the network, wherein the second data message is received by the distributor at the same clock count as the first data message; transmitting the first and second data message to at least part of the controllers based on the delay schedule, wherein the order in which the first message and second message are transmitted to the at least part of the controllers is based on an arbitration scheme, preferably an arbitration scheme based on round robin, a random and/or priority scheduling. Hence, an arbitration scheme may be used to determine the order in which the distributor transmits different messages.

In an embodiment, the transmission of the first data message may be based on a broadcast transmission scheme. In another embodiment, the transmission of the first data message may be based on unicast or multicast schemes, In an embodiment, the unicast or multicast schemes may include device addresses and a routing table comprising addresses of the data processing devices in the network.

In an embodiment, the synchronizing may further include: linking the internal clock of the distributor to a timer, the timer representing an absolute clock time for all distributors and data processing devices in the network.

In an embodiment, the internal clock of the distributor may be phase-aligned with the internal clocks of the data processing devices in the network.

The invention includes synchronization of the internal clocks of the data processing device. In an embodiment, the internal clocks of the data processing devices may be phase-locked and phase-aligned with respect to each other. In a further embodiment, the data processing devices may be started simultaneously (based on the same clock edge of the phase-aligned internal clock).

Synchronization may be realized based on a trigger signal generated by a synchronization module. If a trigger signal is used to start all data processing devices simultaneously, measures may be required so that the trigger signal arrives at all data processing devices within the same clock cycle. In a high-speed digital system with clock frequencies of 100 MHz or higher this results in a window in which the trigger should arrive of only a few ns or less. To this end, in an embodiment, lines connecting the trigger module and the data processing devices may be length-matched to eliminate skew caused by unequal propagation delays in the cables.

In another variant, synchronization may be achieved by triggering internal timers of data processing devices in the network based on the rising or falling edge of a slower clock signal (which may be an integer times slower than the internal clocks of the controller). Preferably, the slower clock signal may be phase-locked and phase-aligned with the internal clocks of the data processing devices. An example of such technique is described in WO2020/197396 which is hereby incorporated by reference into this application.

In an embodiment, at least part of the controllers may be configured as quantum controllers for controlling quantum elements of a quantum computer In an embodiment, the distributor may comprise a transceiver connected to data lines forming the point-to-point connections between the distributor and the controllers, the transceiver including an input comprising input data lines and an output comprising output data lines.

In an embodiment, the input data lines being associated with a buffer and/or the output data lines being associated with a delay element.

In a further aspect, the invention may relate to configuring a distributor to control data transmission in a hierarchical network, preferably a (extended) star network, of synchronized data processing devices. In an embodiment, the method may include transmitting, preferably broadcasting, by the distributor, at a transmission time instance, a time-logging message to data processing devices, e.g. qubit controllers, connected to the distributor, the distributor and the data processing devices being part of a hierarchical network of synchronized data processing devices. The method may also include receiving from each data processing device information about the arrival time of the time-logging message at the respective data processing device. The method may further include determining a delay schedule based on the transmission time and arrival times, the delay schedule including information about propagation delays in data lines forming point-to-point connections between the distributor and the data processing devices. The method may also include configuring delay elements in an output of the data lines of the distributor based on the delay schedule so that data messages transmitted by the distributor via the data lines simultaneously arrive at the data processing devices.

The number of modules that can be connected to a distributor may be limited. To create a system in which the number of modules exceeds this limit, a distributed hierarchical network, e.g. an extended star network, can be created where various star networks of controllers (sub-networks) are connected in a new star network using one or more further distributors. In such a network the controllers will form the end-leaf of the hierarchical network.

To maintain synchronicity of the data processing devices over the entire network, a data message is first sent to the distributor highest in the hierarchical network. In response, this distributor sends the message down through the network, meanwhile compensating for delays at every distributor a message passes, starting at the top most distributor. In some cases, synchronicity may be required only between modules in one branch of the hierarchical star network, the process can be sped up by only sending the message to the distributor of this sub-network before sending the message to the other modules in this sub-network.

In yet a further aspect, the invention may relate to a method for controlling data transmission in a hierarchical network of data processing devices, wherein the data processing devices may include controllers and distributors.

In an embodiment, the method may include: receiving, by a first distributor, a reference clock signal for synchronizing clocks of the data processing devices in the network; synchronizing, by the first distributor, its clock based on the reference clock signal so that the clock of the first distributor is synchronized with the clocks of the other data processing devices in the network; and, controlling, by the first distributor, time-delayed transmission of a data message to controllers connected to the first distributor, the controlling including: receiving a first data message from a second distributor, the second distributor having a hierarchy that is higher than the hierarchy of the first distributor; and, transmitting the first data message based on a delay schedule so that the transmitted first data messages simultaneously arrive at the controllers connected to the first distributors, the delay schedule including information about propagation delays associated with point-to-point connections between the first distributor and the controllers In an embodiment, the controlling may further include: receiving a second data message from a controller connected to the first distributor at the same time instance the first data message was received, wherein the second data message needs to be transmitted by the first distributor to at least part of the controllers connected to the first distributor; storing the second data message in a buffer for a period wherein the first data message is transmitted on the basis of the delay schedule to the controllers; and, transmitting the second data message to at least part of the controllers connected to the first distributor.

In another embodiment, at least one of the distributors, preferably the second distributor, may form the root of the hierarchical network, further distributors form nodes of the hierarchical network and the controllers form the leaves of the hierarchical network.

In a further aspect, the invention may relate to a distributor apparatus for controlling data transmission in a hierarchical network of data processing devices, the distributor apparatus comprising: a clock, a computer-readable storage medium having at least part of a program embodied therewith; and, a computer-readable storage medium having computer-readable program code embodied therewith, and a processor, coupled to the computer readable storage medium, wherein responsive to executing the computer-readable program code.

In an embodiment, the processor may be configured to execute one or more of the following steps: receiving a reference clock signal for synchronizing clocks of the data processing devices in the network; synchronizing the clock of the distributor apparatus based on the reference clock signal, so that the clock of the distributor is phase-aligned with the clocks of the controllers; and, controlling time-delayed transmission of a data message to at least part of the controllers so that the transmitted data messages simultaneously arrive at the controllers, the time-delayed transmission being based on a delay schedule including information about propagation delays associated with point-to-point connections between the distributor and the controllers.

The invention may also relate to a computer program product comprising software code portions configured for, when run in the memory of a computer, executing the method steps according to any of the process steps described above.

The invention will be further illustrated with reference to the attached drawings, which schematically will show embodiments according to the invention. It will be understood that the invention is not in any way restricted to these specific embodiments.

BRIEF DESCRIPTION OF THE DRAWINGS

FIG. 6 depicts a block diagram of a method for controlling data transmission in a network of data processing devices according to an embodiment of the invention;

FIG. 8 depicts a block diagram of a method of determining propagation delays in a network of data processing devices according to an embodiment of the invention;

DESCRIPTION OF THE EMBODIMENTS

Figure 1:
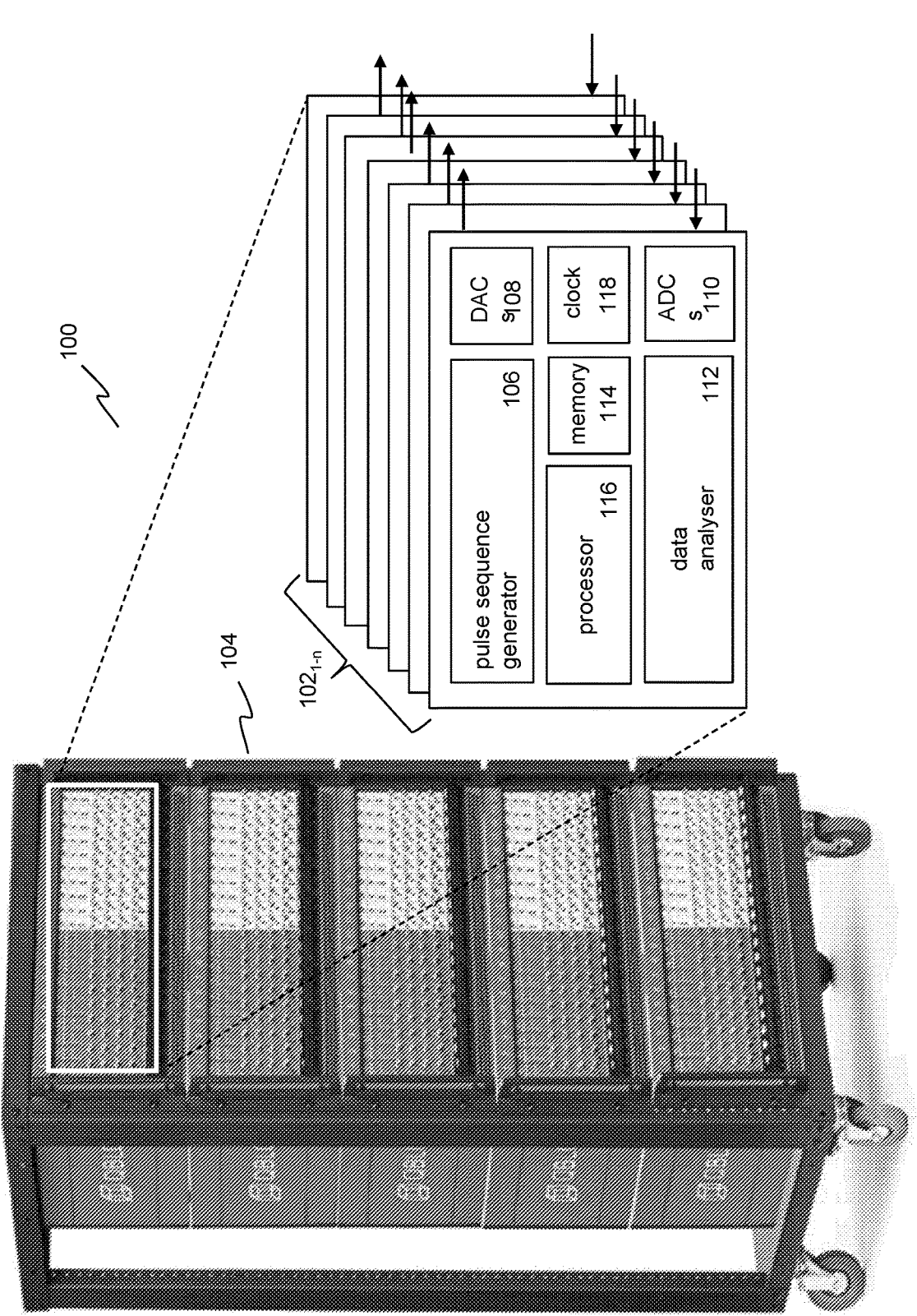
FIG. 1 illustrates a control system for controlling a quantum system.

FIG. 1 illustrates a control system for controlling a quantum system. The control system 100 may comprise a plurality of modules 102$_{1-n}$, data processing devices, arranged in a mounting structure 104, e.g. a rack. As shown in the figure, each module may include high-speed control electronics, e.g., FPGA-based electronics, for independently controlling part of a quantum system, e.g. one or more qubits. Qubits may be controlled by sending a predetermined sequence of high-frequency analog pulses to the quantum computer. To this end, a module may include a pulse sequence generator 106 for constructing a digital pulse sequence based on digital pulse signals stored in a memory 114 and a digital-to-analog converter DAC 108 for transforming the digital signal into an analog signal. Further, response signals, e.g. measurements representing a quantum state of a qubit, originating from the quantum device may be digitized by an analog-to-digital converter ADC 110. These signals are subsequently processed by a data analyzer 112.

A module may further include a processor 116, e.g. a CPU and a clock 118 that is used for timing the processes executed by the module. The system may be connected to a computer (not shown) which may be configured to execute a computer program, e.g. a compiler, that is configured to translate a high-level program representing an algorithm to be executed on a quantum computer (a quantum algorithm) into instructions for the modules. These instructions may represent a quantum circuit comprising a sequence of quantum gate operations, which are the quantum versions of the logic gate operations executed by a classical computer. Quantum gate operations are translated into a sequence of analogue pulses for setting initial states of qubits, for letting qubits interact with each other and for readout end states of qubits. The instructions may be stored in the memory and independently executed by the processor of a module. During execution of the instructions by the modules, data received and/or processed by one module may be required as input for one or more other modules. Hence, during execution of a quantum algorithm on a quantum computer by the modules, orchestrated and synchronized data distribution within the network of the modules is needed.

Further, it is desired that the control system is modular in the sense that a control system may include multiple subsystems each comprising a plurality of connected modules. These subsystems may form (or be arranged in) a hierarchical network. As will be described hereunder in more detail, the control system may be configured such that the modules in the network allow synchronized, high-speed, low-latency data exchange between the modules. This way, optimal performance of the quantum system can be guaranteed, which is independent of the size and/or configuration of the network.

Figure 2:
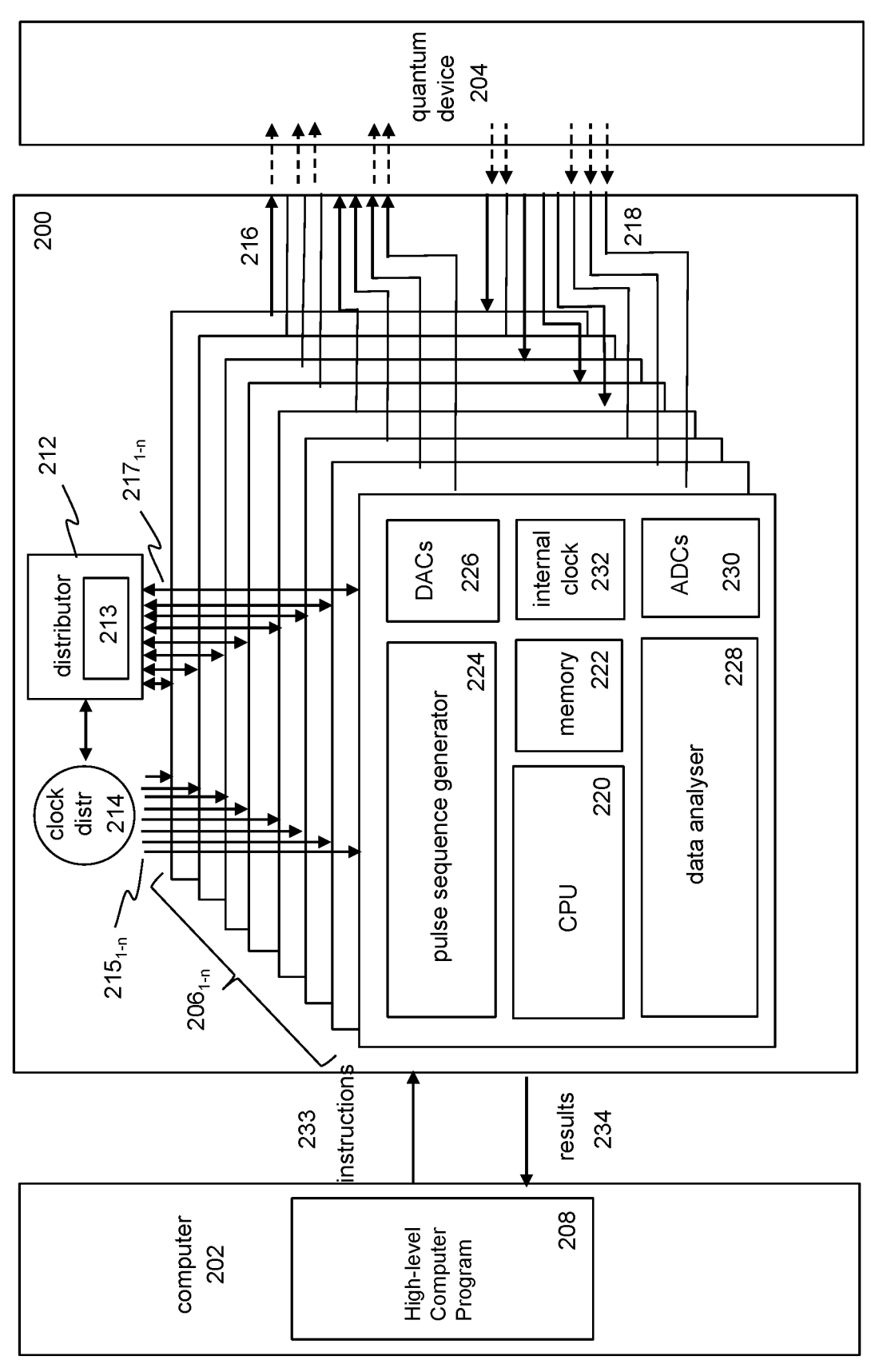
FIG. 2 illustrates part of control system according to an embodiment of the invention.

FIG. 2 illustrates part of the control system according to an embodiment of the invention. In particular, the figure illustrates a control system 200 connected to a classical computer 202 and a quantum device 204, e.g. a quantum computer comprising qubits or the like. The computer may execute a suite of software programs, including e.g. a compiler or an interpreter, for translating software code of a high-level programming language to instructions 233 for a network of controller modules 206$_{1-n}$. One or more modules may be implemented similar to the one described with reference to FIG. 1, including, but not limited to, a pulse generator 224, DACs 226, ADCs 230, a data analyser 228, a memory, an internal clock 232 and a processor 220 configured to execute a set of instructions. This way, the module can transmit pulse sequences as an output signal 216 to the quantum device for controlling the qubits so that they can interact, e.g. entangle, with each other according to a certain quantum circuit. Further, the state of the qubits can be measured, and an output signal 218 originating from the quantum device may be read and processed by the data analyser of the module. Other modules may be configured to perform other functions, e.g. a central data processor for processing data of other modules, such as an error decoder.

A clock distribution system 214 may be configured to provide a reference clock signal via a plurality of clock distribution lines 215$_{1-n}$ to each of the modules, which may use the reference clock signal to synchronize their internal clocks. The reference clock signal may be further used to simultaneously start a timer, e.g. a counter, in each of the modules, wherein the synchronized internal clock is used to increase the counter. This way, the modules have a common clock source wherein the internal clocks of the modules may be phase-aligned. This way, the timer signal may be used as an absolute time reference for all the modules in the network. Each module may be connected via a point-to-point connection to the clock distribution system. In an embodiment, the lengths and/or geometries of the data lines may be configured such that a reference clock signal that is transmitted to the modules will arrive simultaneously at the inputs of the different modules.

Different schemes may be used to achieve a common absolute time that is shared between the modules. For example, in an embodiment, synchronization may be realized based on a trigger signal starting a timer that counts clock cycles. If a trigger signal is used to start all data processing devices simultaneously, measures need to be taken that the trigger signal arrives at all data processing devices within the same clock cycle. In a high-speed digital system with clock frequencies of 100 MHz or higher this results in a window in which the trigger should arrive at a target of only a few ns or less. To this end, trigger lines may be length-matched to eliminate skew caused by unequal propagation delays in the cables.

In another embodiment, a synchronization scheme as described in the PCT application WO2020/197396 may be used. The contents of this PCT application may hereby be incorporated by reference into this application. In that synchronization scheme, synchronization may be achieved by triggering internal timers based on the rising or falling edge of a slower clock signal (which may be selected to be an integer times slower than the internal clock of the controller). In an embodiment, the slower clock signal may be phase-locked and phase-aligned with the internal clocks of the data processing devices.

Once the timers are synchronized and set, each module can use the timer signal as an absolute time indication. This may be realized by counting each clock cycle from the moment the timers are triggered during the synchronization process. Thus, at each time instance, all modules simultaneously experience an identical timer value, which may be referred to as a common clock count. In that case, the modules may be considered to be synchronized, so that all tasks, e.g. execution of instructions, can be scheduled based on the common clock count. To provide synchronous information exchange between the modules without the need for status updates and evaluation on a slow time grid as known from the prior art, the synchronized modules may be connected in a hierarchical network, for example a star network. The modules may be connected via a plurality of data lines $217_{1-n}$, which form point-to-point connections, with a central network element, referred to as the distributor 212, which is also synchronized with the modules. If a module wants to transmit a message to other modules, the message is first sent to the distributor, which forms the hub of the star network. In turn, the distributor may transmit via the data lines the message to all data processing devices connected to it, including the data processing device that initially sent the message.

The distributor may be configured to control the transmission of the message by delaying the messages on each connection so that differences in transmission times due to differences in the length and/or geometry of the data lines are compensated. The exact delay for each data line connected to the distributor may be determined in a separate calibration process. Executing the calibration process may result in a set of delay times, forming a delay schedule 213 that can be used to set delay elements in the transmission circuitry of the distributor. This way, a data message sent from one data processing device to a distributor may be resent by the distributor to the data processing devices that arrive simultaneously (i.e. at the same clock cycle) at the inputs of the data processing devices connected to the distributor.

Figure 3:
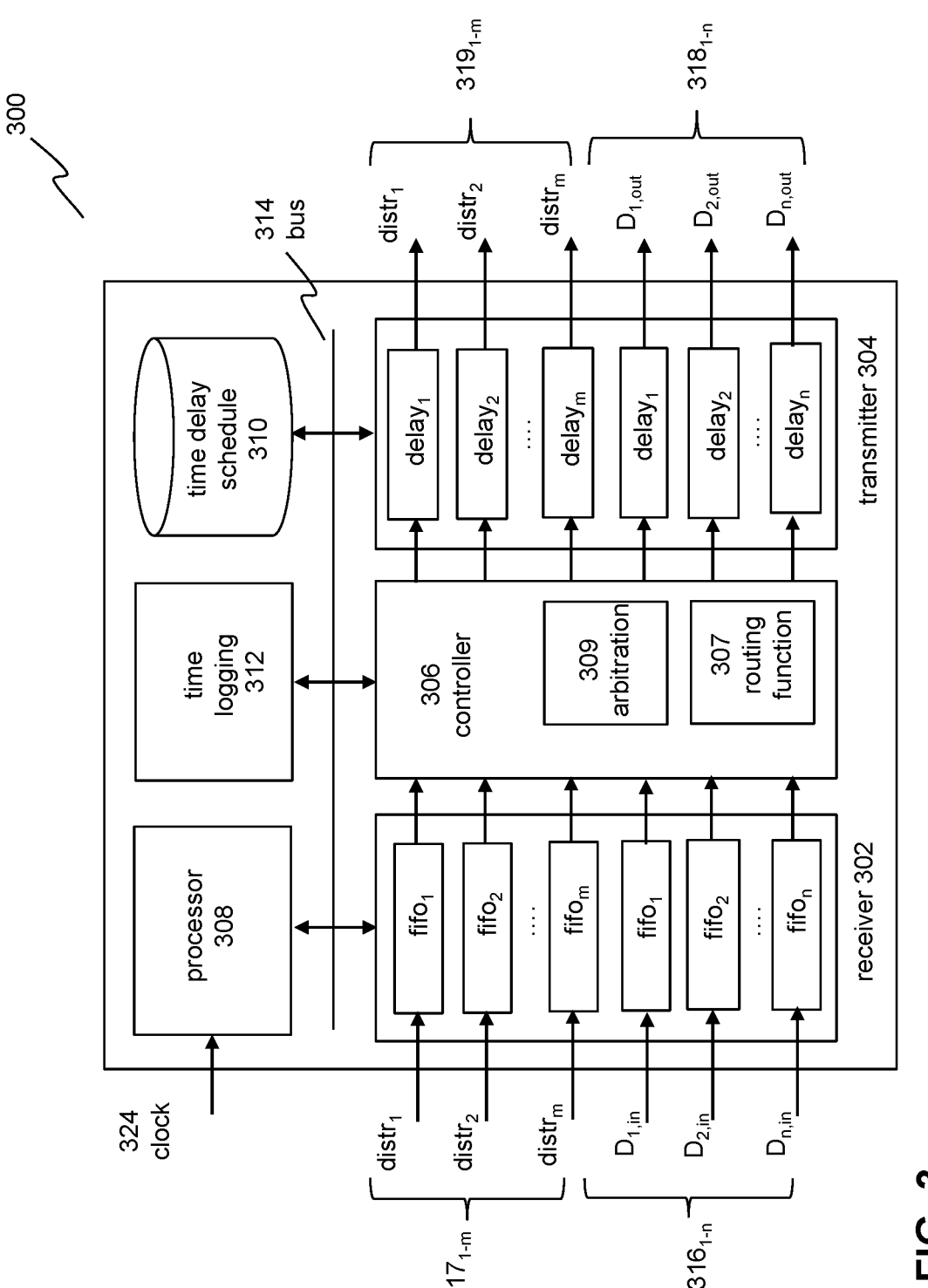
FIG. 3 depicts a network of controllers according to an embodiment of the invention.

FIG. 3 depicts a data processing device according to an embodiment of the invention. In particular, the figure depicts a distributor 300, which may be configured as a host for a star network of connected data processing devices (e.g. controllers and, optionally, further distributors). The distributor may be configured to distribute data to connected data processing devices (including the original sender) in a synchronized way. A predetermined number of data lines may be connected to an input/output I/O interface of the distributor. Data lines $316_{1-n}$, $318_{1-n}$ may connect the distributor to controllers, e.g. quantum controllers configured to control one or more qubits of a quantum computer. In some embodiments, further data lines $317_{1-n}$, $319_{1-n}$ may be connected to one or more further distributors.

The I/O interface may be configured as a transceiver. This way, the distributor may receive or transmit data over the data lines to or from data processing devices in the network. Typically, the distributor will work in a full duplex mode having dedicated input lines and output lines. Hence, typically a point-to-point connection between a distributor and a data processing device or a further distributor may include a pair of data lines including an input data line for receiving data messages and an output data line for transmitting data messages. The input of the distributor may include a receiver 302 comprising an input for messages transmitted via data lines to the distributor. Data lines $D_{i,in}$ i=1, . . . , n $316_{1-n}$ connected to the output of controllers may include buffers, e.g. first-in-first-out buffers fifoi i=1, . . . , n, so that the distributor can receive, and process multiple messages transmitted by one or more controllers. The output of the distributor may include a transmitter 304 comprising an output for transmitting messages via the data lines to data processing devices.

The output data line $D_{i,out}$ i=1, . . . , n connected to controllers may include delay elements delay, i=1, . . . , n for delaying transmission based on a delay time. The delay elements of the data line outputs may be configured such that differences in data transmission times are compensated. Hence, during transmission, a data message may be prepared for output at each output line, which may trigger the programmed delay elements to start counting based on the common clock count. Once a delay period of a particular delay element is finished, a message over the data line to a data processing device. This process may be referred to as time-delayed transmission.

An I/O controller 306 may control the receiver and transmitter mode of the transceiver to provide the desired functions of the distributor. For example, in case a data line connects two distributors, a data message is sent from a first distributor to a second distributor that is closer to the root distributor than the first e.g. the root distributor, no delay compensation is used. Hence, in that case, the message may be transmitted directly to the second distributors. Conversely, a data message transmitted by the second distributor to the first distributor (away from the root distributor), a delay compensation is used. In some embodiments, the controller may include a module 307 comprising one or more routing functions to support different data transmission schemes, including well-known schemes such as unicast, multicast, broadcast, etc. In case of unicast and multicast, the module may include a routing table including the addresses of the distributors and controllers in the network. In that case, the distributor may be configured to construct messages comprising an address of the target data processing device, e.g. a distributor or a controller. In some embodiments, the distributor may include a module 309 comprising an arbitration scheme, e.g. rules related to the sequence in which data messages that arrive at the different input data lines should be processed. For example, if a distributor and a controller want to transmit a data message over a data line at the same time instance, the data message of the distributor may have priority. Similarly, if a distributor receives a data message from a distributor and a controller at the same time instance, it may prioritize the processing of the data message originating from the distributor. Further, if a distributor receives data messages from two or more controllers it may use a well-known arbitration scheme, e.g. round-robin or random selection, to process the data messages. Examples of further arbitration rules are described in more detail with reference to FIG. 10.

In some embodiments, the distributor may comprise a time logging module 312, which may trigger a time logging process in which propagation delays associated with data lines of the point-to-point connections in the network of data processing devices may be determined. Information about the propagation delays determined during the time logging process may be stored as a delay schedule in a data storage 310. During the time logging process, the delay compensation in the output data lines of the distributor may be switched off. Further, processes executed in the distributor may be managed by a processor 308 which may be connected via a bus 314 to other elements of the distributor. While the processor in the figure is depicted as a separate entity, the processor may also be distributed over and/or integrated with other elements of the distributor, for example at least part of the processor may be implemented in the I/O controller. Similarly, in some embodiments, the time logging module may be external to the distributor.

Thus, the transceiver may receive a data message from a controller. Thereafter, the I/O controller may configure the transmitter to transmit the message via output data lines to the controllers. The timing of the transmission at each output data line is determined by the delay elements which are set in accordance to the delay times of the delay schedule so that the data messages will arrive at the same clock count at the inputs of the controllers. Thus, by compensating for the propagation delays in the data lines of the network, the distributor ensures that a data message is received by all modules simultaneously within the accuracy of one clock cycle. This way, the distributors allow the modules to continuously send and evaluate messages, thereby reducing latency in the communication compared to the prior art. As soon as a controller receives a data message from a distributor, the controller knows that it can immediately use the data for processing in a next stage of the quantum algorithm. Further, it also knows that all or a certain part of the controllers in the network will have access to the same data message.

While a distributor in FIGS. 2 and 3 is illustrated as a separate entity, it is submitted that in other embodiments the distributor may be part of another functional entity, e.g. a controller. It is submitted that FIG. 3 describes a non-limiting embodiment and many different variants are possible without departing from the essence of the invention. For example, while FIG. 3 describes the delay elements as part of the distributor, the delay elements may also be external to the distributor, for example somewhere in the point-to-point connection, such as near the input side or the output side of the data line.

Figures 4, 5:
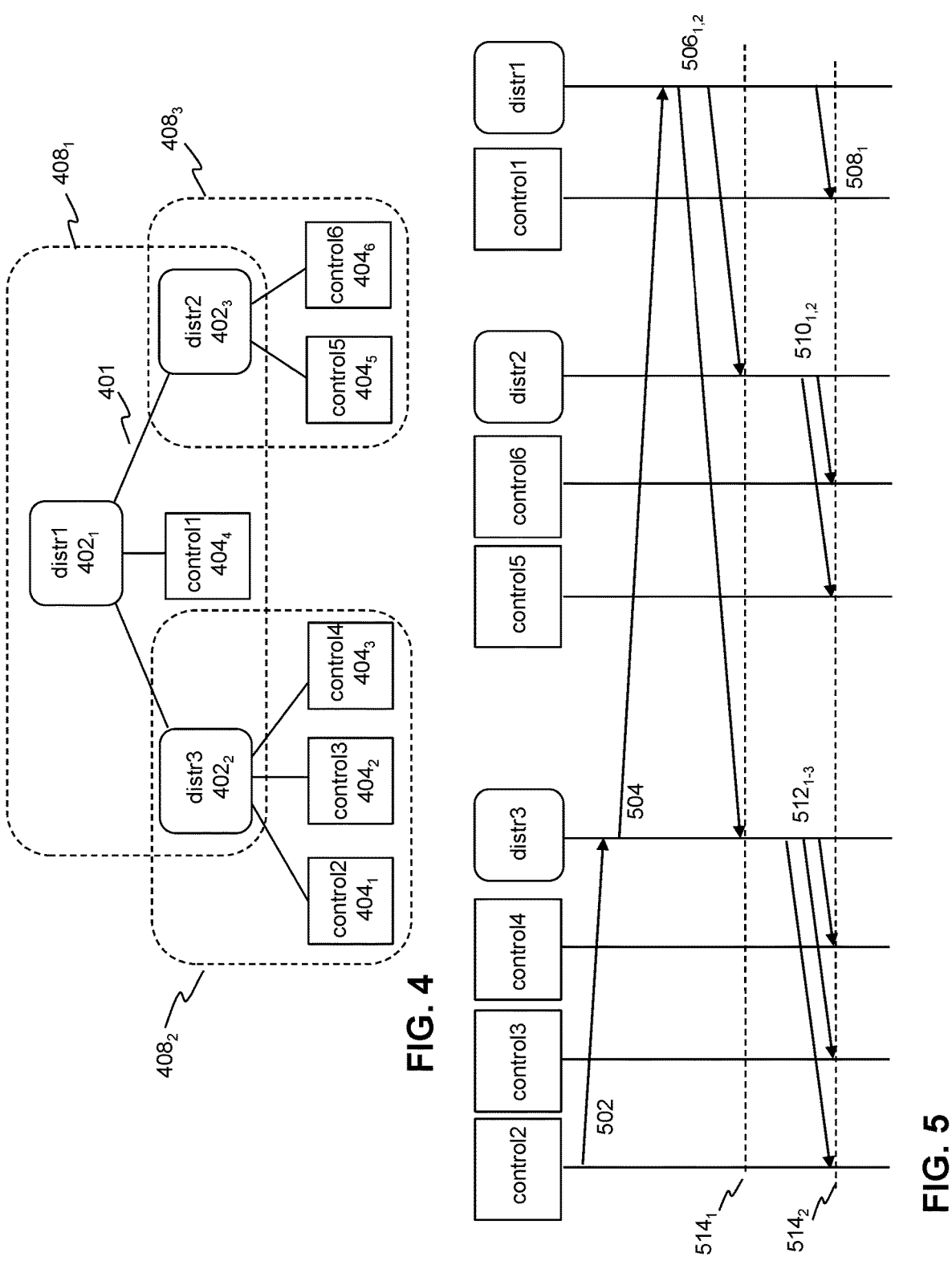
FIG. 4 illustrates an example of a network of data processing devices according to an embodiment of the invention.
FIG. 5 depicts a flow diagram of a method for controlling data transmission in a network of data processing devices according to an embodiment of the invention.

As shown in FIG. 3, a distributor may be physically limited by its number of in- and outputs to a maximum number of modules it can communicate with. To make the control system scalable, a nested star network may be created where multiple distributors are directly connected and wherein each network by itself forms a star network with the data processing devices it is connected to. Hence, a network may include one distributor connected to controllers in a star network configuration. Alternatively, a network may include multiple distributors forming a nested star network configuration. An example of such a nested star network is illustrated in FIG. 4. As shown in the figure, the data processing devices may include multiple distributors $402_{1-3}$, in particular three distributors, and a plurality of controllers $404_{1-4}$. The data processing devices may be distributors and controllers as described with reference to FIG. 1-3.

The network may be organized as a hierarchical tree network wherein the distributors may form the root and nodes of the network and wherein the other data processing devices, e.g. the controllers, form the end leaves. The distributor having the highest hierarchy in the network may be referred to as the root distributor $402_1$. Each controller may be connected via a data line to a distributor thus forming a point-to-point connection 401 between the controller and the distributor. Typically, the data lines may be configured as a two-way communication channel which may be based on a full-duplex data transmission scheme. As shown in the figure, the network may comprise a number of sub-networks $408_{1-3}$ wherein in each sub-network a distributor controls the transmission: a first sub-network comprising the root distributor $402_1$ controlling the transmission of data messages to one controller 404 and two distributors $402_{2,3}$; a second sub-network $408_2$ comprising distributor $402_1$ controlling transmission of data messages to three controllers $404_{1-3}$ and a third sub-network $408_3$ comprising distributor $402_3$ controlling transmission of data to two controllers $404_{5,6}$. Each of these distributors may be configured to control data transmission based on its delay schedule, which may be different for each distributor. This way, data messages transmitted, e.g. broadcast, via its output data lines will arrive simultaneously at the inputs of the data processing devices connected to these output data lines.

To maintain synchronicity in a network as depicted in FIG. 4, a data message of a controller, may be first transmitted to the root distributor before being fanned out again towards the controllers forming the leaves of the tree network. This process is depicted in FIG. 5. This figure depicts a flow diagram of controlling data transmission in a network of synchronized data processing devices wherein the network topology may be similar to the one described with reference to FIG. 4. Here, synchronized means that the data processing devices share an absolute clock signal, e.g. a common clock count.

The process may include a first step 502 wherein a controller, controller 2, transmits a data message to a first distributor, distributor 3, over a data line connecting the controller to the first distributor. In response (step 504), the first distributor may forward the message to a second distributor, distributor 1, the root distributor of the network. The root distributor may receive the message and transmits, in this example broadcasts, the data message based on its delay schedule downstream back to the first distributor, distributor 3 and a third distributor (steps $506_{1,2}$) so that these messages arrive simultaneously, i.e. at a predetermined first clock count, at the respective distributors (as indicated by the first hashed line $514_1$). Upon reception of the data message by the respective distributors, each distributor, i.e. distributor 2 and 3, subsequently broadcasts the data message based on its delay schedule to the respective controllers as illustrated by steps 508, $510_{1,2}$ and $512_{1-3}$, so that all data messages arrive simultaneously, i.e. at a predetermined second clock count, at the respective distributors (as indicated by the second hashed line $514_2$).

FIG. 6 depicts a block diagram of a method for controlling data transmission in a network of synchronized, e.g. phase-aligned, data processing devices according to an embodiment. The hierarchical network may be a star network of data processing devices wherein each of the data processing devices is connected to a host, a root distributor, which may act as a conduit to receive and transmit messages. In an embodiment, the data processing devices may include controllers, e.g. quantum controllers, and at least one distributor, wherein the distributor may be connected to each of the controllers based on data lines forming wired point-to-point connections. The method may start with receiving, by the distributor, a reference clock signal for the data processing devices to synchronize their clocks based on the clock signal (step 602). Thus, the data processing devices may use the reference clock signal to synchronize their clocks based on the reference clock. This process may include phase-aligning the internal clock based on the reference clock signal. This process may also include synchronizing and setting an internal timer (e.g. a counter) to create an absolute time indication (i.e. common clock count) as for example described with reference to WO2020/197396. This way, the internal clock of the distributor may be phase-aligned with the internal clocks of the other data processing devices and the internal timers of the distributor and the other data processing devices are synchronized to produce a common clock count (step 604). Then, the distributor may control, e.g. schedule and execute, transmission of data messages to the controllers in the hierarchical network based on a delay schedule. The delay schedule may be implemented by programming delay elements based on propagation delays associated with point-to-point connections between the distributor and other data processing devices. To that end, the delay schedule may include propagation delays or information associated with propagation delays for each point-to-point connection. This way, if a message is transmitted, e.g. broadcasted, by the distributor to the processing devices the data messages will simultaneously arrive, in sync, at the processing devices (step 606).

Figure 7:
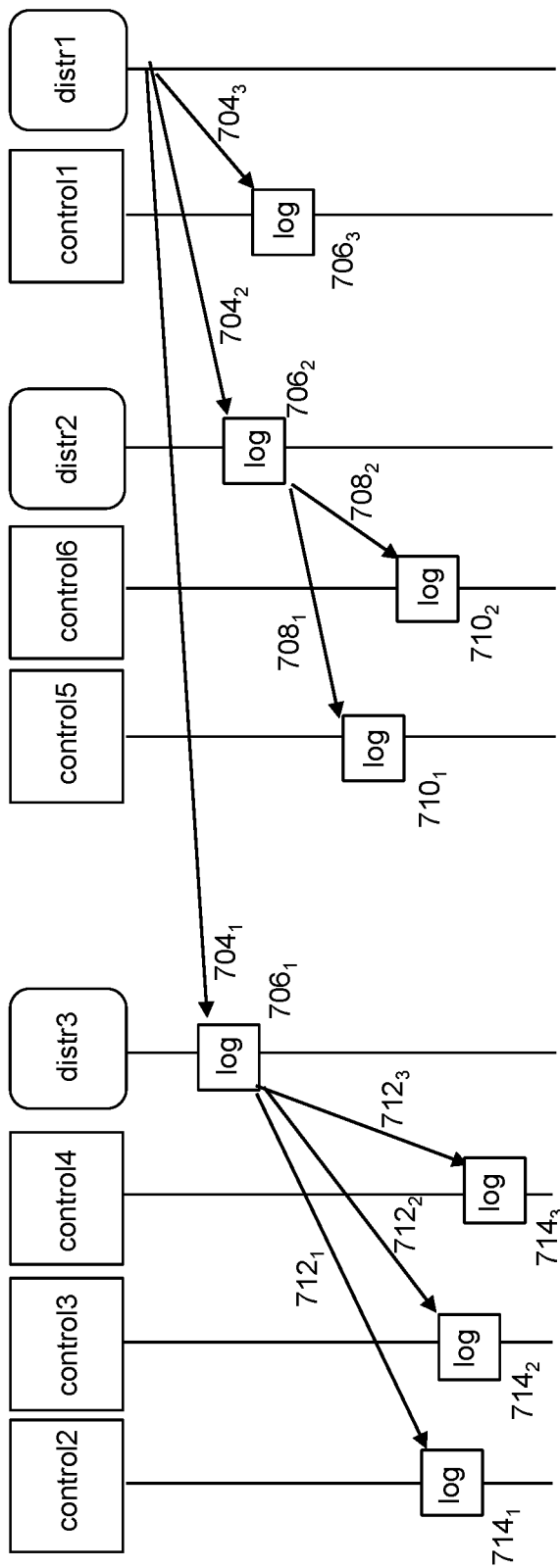
FIG. 7 depicts a scheme for determining propagation delays in a network of data processing devices according to an embodiment of the invention.

To determine delay schedules for distributors in an arbitrarily (nested) star network of data processing devices, a discovery process may be executed that is capable of determining propagation delays in the network. An example of such a process is depicted in FIG. 7. In particular, the figure depicts a flow diagram of a method of determining propagation delays in a synchronized network of data processing devices according to an embodiment of the invention. The network may be similar to the synchronized network as described with reference to FIGS. 5 and 6. Further, each of the data processing devices in the network may comprise a time logging module, which may be similar to the one described with reference to FIG. 3. Further, a time logging module, e.g. a time logging module in one of the distributors such as the root distributor, may be configured to start the time logging process. To that end, the time logging module may create a time logging message and transmit the time logging messages $704_{1-3}$ to the data processing devices it is connected to. During this process, the time delay functionality at the output data lines of the distributor may be switched off so that the message may arrive at different time instances (clock counts of the common clock count of the network) due to different propagation delays in the data lines. The root distributor may determine at what time (in clock counts) the time logging messages were transmitted (broadcasted) and store this information as a transmission time in its memory.

If a time logging message is received by a data processing device, it will trigger the time logging module $704_{1-3}$ of the data processing device to determine the reception time of the time logging message by the data processing device. The reception time of the message may be expressed in clock counts. Thus, when the time logging message is received by a data processing device in the network a time stamp is created by a time logging module $706_{1-3}$ of a data processing device. If the data processing device is a distributor, the reception of the time logging message may also cause the distributor to switch off its delay compensation functionality at its output. This way, once the time logging message is time-stamped and the time-stamp is stored in the memory of the distributor, the distributor may forward time logging messages (e.g. time logging messages $708_{1,2}$ and $712_{1-3}$) to further data processing devices in the network, wherein the time logging modules of these data processing devices (e.g. time logging module $710_{1,2}$ and $714_{1-4}$) will be triggered by the time logging message to determine and store an arrival time of the time logging message.

This way, time logging messages may propagate through the network until they arrive at controllers that form the leaves of the tree network. The generated arrival times associated with the time logging process may be sent back to the root distributor (or another module) which may determine propagation delays based on the transmission time and arrival times of the time logging message. The propagation delays may then be used to determine delay schedules for the distributors in the network. Different ways may be used to determine the delays schedules without departing from the invention. For example, the time logging module of the root distributor may process the transmission time and the arrival times and provide each distributor with a delay schedule. Alternatively, the root distributor may transmit the transmission time and the arrival times to the distributors which each determine a delay schedule based on the received information.

FIG. 8 depicts a block diagram of a method of determining propagation delays in a network of synchronized data processing devices according to an embodiment of the invention. The network may be a hierarchical network of data processing devices organized in a (distributed) hierarchical network, e.g. a star network, as for example explained with reference to FIG. 7. The network of data processing devices may include one or more distributors and controllers connected via data lines to one or more distributors.

The method may include the distributor transmitting, preferably broadcasting, at a transmission time instance a time-logging message via the data lines to the data processing devices it is connected to (step 802). Each data processing device receiving the time-logging message may determine an arrival time of the time-logging message at the input of the respective data processing device. Then, in response to the time-logging message, the distributor may receive from each data processing device information about the arrival time of the time-logging message (step 804). Then, based on the transmission time and arrival times the distributor may determine a delay schedule may be determined (step 806). The delay schedule may include information about propagation delays in data lines forming point-to-point connections between the distributor and the data processing. Further, the method may include configuring delay elements associated with data lines of the distributor based on the delay schedule so that data messages transmitted by the via the data lines simultaneously arrive at the data processing devices (step 806).

The data transmission scheme of FIG. 5 describes an example wherein the routers of the distributors have no addressing functionality and just simply broadcast messages to any connected module or distributor. To facilitate more advanced applications, the router can also support other transmission schemes such as unicast schemes allowing point-to-point data communication. These schemes can be implemented by using for example an address table in the distributor's router function and by adding address information in the data messages. These different routing functions may be used in combination with a variety of different arbitration schemes (e.g. random, round-robin) to prevent situations like access time starvation due to multiple messages being sent at the same time to the same distributor.

Figures 9A, 9B:
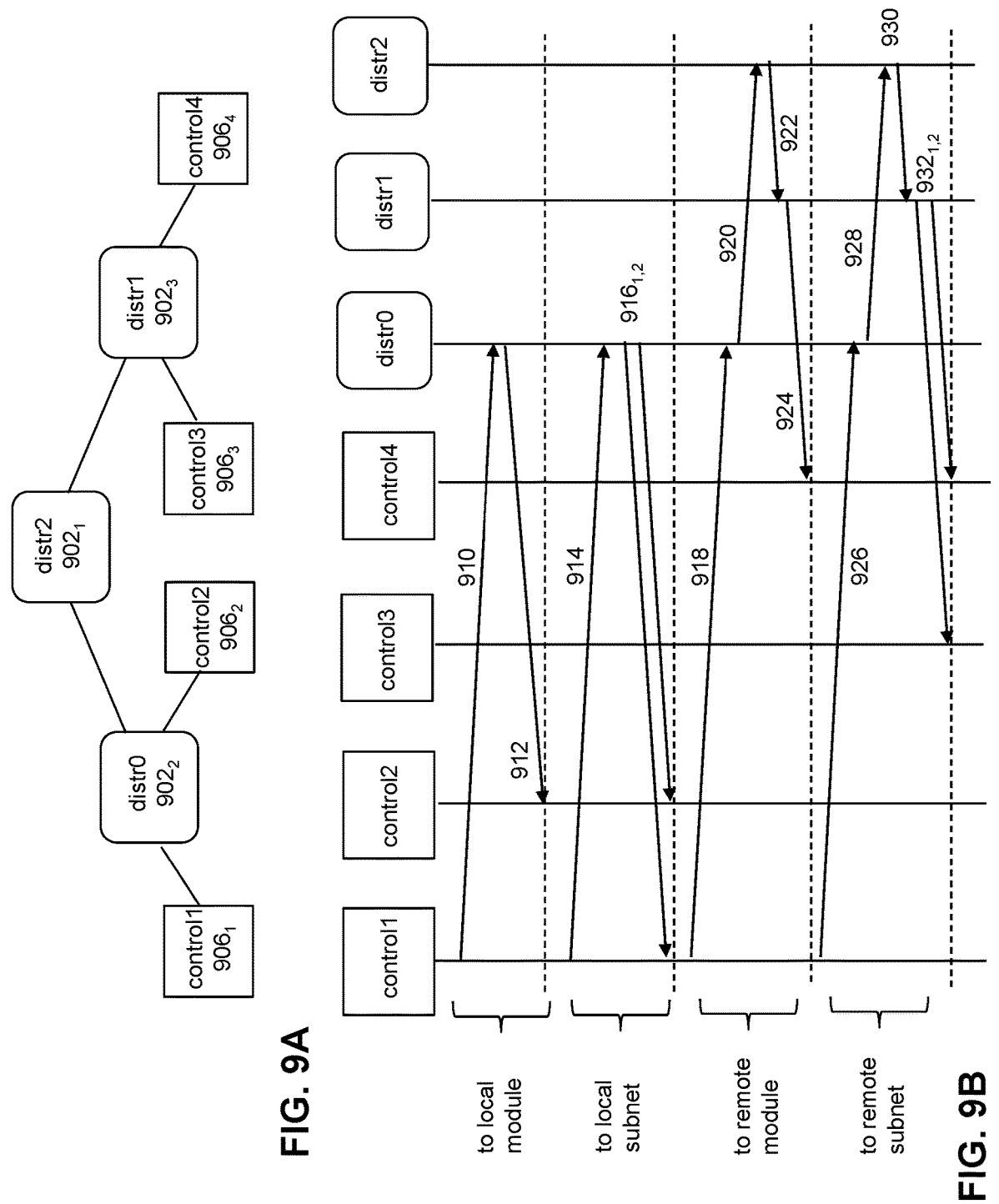
FIGS. 9A and 9B illustrate a scheme for controlling data transmission in a network of data processing devices according to an embodiment of the invention.

Examples depicting transmission to different parts of a network of data processing devices using distributors that have addressing functionality are shown in FIGS. 9A and 9B. The network shown in FIG. 9A includes a simple hierarchical network, including a root distributor $902_1$ connected to two distributors $902_{2,3}$, each being connected to two controllers $906_{1-4}$. The routing function in the distributors and controllers may include an address table comprising the addresses of the distributors and the controllers in the network so that a message can be sent directly to different parts of the network. In contrast to the broadcast scheme of FIG. 5, which requires that the message is first sent to the root distributor, targeted transmission to only one or a few controllers in the network allows routing of the message via a local distributor only. For example, messages 910,912 illustrate point-to-point data transmission scheme wherein a data message from controller 1 may be sent to distributor 0 which subsequently sends the data message to controller 2 of the local subnetwork that is controlled by distributor 0. Similarly, messages 914, $916_{1,2}$ illustrate a point-to-multipoint data transmission scheme wherein a data message of controller 1 may be sent to distributor 0 which subsequently transmits the data message to the controllers of the subnetwork fed by distributor 0. The same type of transmission schemes may be used when transmitting a data message from a controller of the first sub-network, via the second (root) distributor to a second sub-network that is fed by distributor 1. This way, either an individual controller of the second sub-network (steps 918-924 of the flow diagram of FIG. 9B) or all controllers of the second sub-network (steps 926-932 of the flow diagram of FIG. 9B) may be addressed. Routing schemes as illustrated in FIG. 9 allow synchronized transmission of data messages to individual subnets or modules, thereby reducing network traffic and potentially improving communication latency.

To guarantee determinism and prevent access time starvation (i.e. a controller has to wait for a substantial period before the distributor transmits a data message to a certain controller), a distributor may implement an arbitration scheme. The arbitration scheme may be used to determine in case of a collision which message will be processed first. For example, if two controllers or a controller and distributor both send a data message at the same time to the same distributor, the distributor will use one or more rules of the arbitration scheme to determine which message gets priority. In the case of multiple controllers transmitting a data message at the same time to the same distributor, the arbitration scheme can be based on round-robin, random or any other form of arbitration. Similarly, a distributor receiving a first data message from a controller which needs to be transmitted to all controllers connected to the distributor (i.e. transmission in a subnet controlled by this distributor) and at the same time instance, the distributor receives a second data message from another distributor (higher in the network hierarchy), the second data message will be prioritized over the first data message. Thus, messages that need to be sent downstream (away from the root distributor) are prioritized over incoming messages that need to be sent downstream in the local subnet. Failing to do so, may cause failure of simultaneous delivery of messages to controllers.

Figure 10:
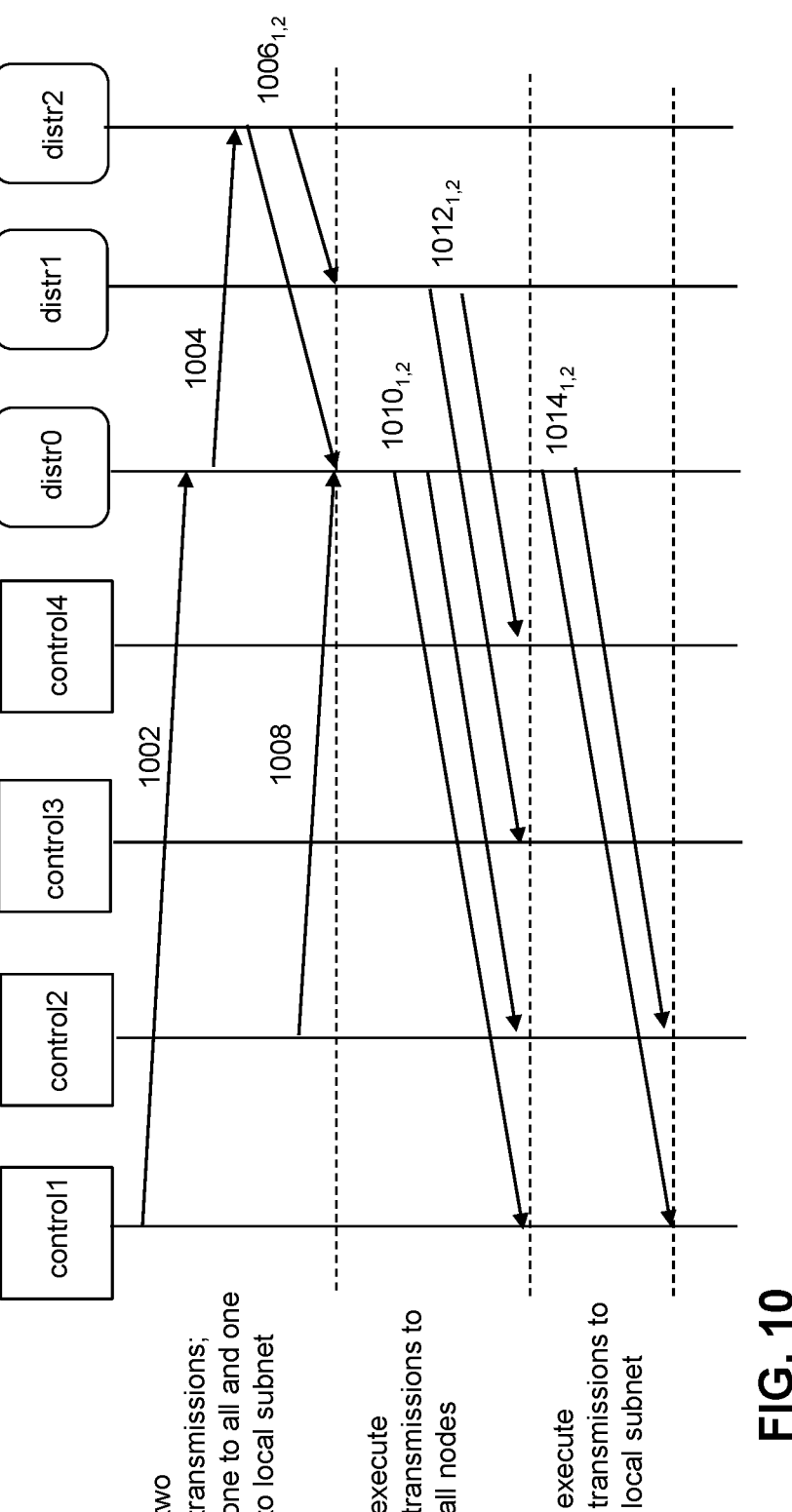
FIG. 10 depicts a flow diagram of a method for controlling data transmission in a network of data processing devices according to another embodiment of the invention.

An example of a simple priority rule is illustrated in FIG. 10, which shows a flow diagram of messages in a network of data processing devices similar to the one described with reference to FIG. 9A. As shown in this figure, a first message may be transmitted by a first controller to a first distributor, distributor 0, which will forward the message to the root distributor, distributor 2 for subsequent downwards transmission to all controllers in the network. Hence, the root distributor will transmit the data message to distributors 0 and 1, in such a way that both messages will arrive at the same time instances at the distributors. However, at the same time controller 2 may send a data message to distributor 0 for transmission to the controllers in the subnetwork controlled by distributor 0, i.e. controller 1 and 2. In that case, an arbitration function in the distributor 0 makes sure that the processing of the data message $1006_1$ originating from the root distributor will be prioritized so that transmission of the data message by distributors 0 and 1 will result in simultaneous arrival of the data message at the controllers 1-4. In that case, the data message originating from controller 1 will be temporarily stored in a buffer at the input of distributor 0. Without this priority rule, distributor 1 would have transmitted its message to controllers 3 and 4 respectively, while distributor 0 can only transmit the data message at a later stage.

It is noted that the schemes described with reference to the figures are only examples of the many different applications that can be realized based on teachings of the embodiments described in this application. For example, in an embodiment, a distributor may be used to create a distributed memory that is virtually shared between all data processing devices. This is achieved by the distributor, by distributing a memory transaction, e.g. a read or write operation, of one data processing device to all other data processing devices in the network. This way, the distributor makes sure the distributed memories stay virtually shared at all times. In other words, each data processing device has access to a local copy of the shared memory. As soon as a local data processing device wants to update a memory value in the local copy, the memory value is sent in a data message to the distributor and the distributor will update all copies of the data processing devices in the network by transmitting the data message to all data processing devices in the network using the schemes as described within reference to the embodiments in this application.

Figures 11A, 11B:
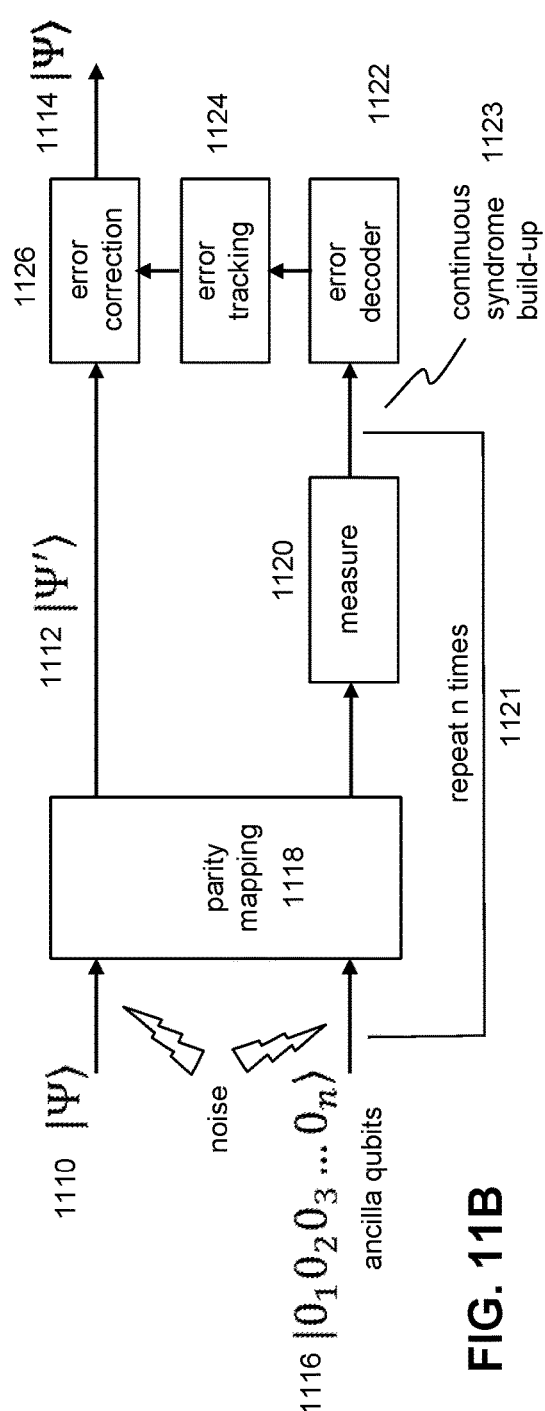
FIGS. 11A and 11B illustrate a scheme for controlling data transmission in a network of data processing devices according to an embodiment of the invention.

In a further embodiment, a distributor may be used to transmit quantum element measurement results to a quantum error decoder and distribute the result of the quantum error decoder to the controllers (or at least a part thereof) in the network. An example of such a scheme is described hereunder in more detail with reference to FIGS. 11 and 12. FIG. 11A depicts a network of data processing devices comprising distributors $1102_{1-3}$ and controllers $1106_{1-4}$ of a similar configuration as to the one described with reference to FIG. 9A, however in this case a special data processing device referred to as a quantum error decoder $1108_1$ is connected to the root distributor.

A schematic of a quantum error decoding scheme is depicted in FIG. 11B. As qubits are fragile and very sensitive to noise, inevitable interactions with the noisy environment will cause errors. To mitigate these errors, so-called logical qubits may be used which are encoded in a number of physical qubits. The physical qubits have a collective a state $|\Psi\rangle$ 1110. Errors in the physical qubits may transform the state $|\Psi\rangle$ into a noise-affected state $|\Psi\rangle$ 1112. Errors in the physical qubits may be flagged via periodic parity measurements 1118,1120,1121 where so-called ancillary qubits 1116 are used to map error information on 1118, which is read out by measuring them 1120. The collection of all repeated parity measurement outcomes is referred to as the syndrome 1123. The measured ancillary qubits comprise information about the error and the syndrome measurement thus determines if physical qubits have been corrupted, and if so, which one and in which of several possible ways it was affected.

To identify which underlying physical errors match these syndromes, a classical calculation needs to be done that uses the syndrome as an input. For this purpose, all parity measurement outcomes need to be sent from the various modules to an error decoder 1122, which may be implemented in an FPGA or the like. The error decoder may determine which errors occurred and distributes these results back towards the controllers in the form of an update to a so-called Pauli frame 1124, i.e. an error table or record that accounts for errors in the system. At any specific point in time, this error record may be used for an error correction event 1126, which may include translating the error correction event into one or more quantum gate operations leading to correction of the errors, transforming the operations into a sequence of correction pulses, applying the correction pulses to quantum elements and flushing the Pauli frame.

Figure 12:
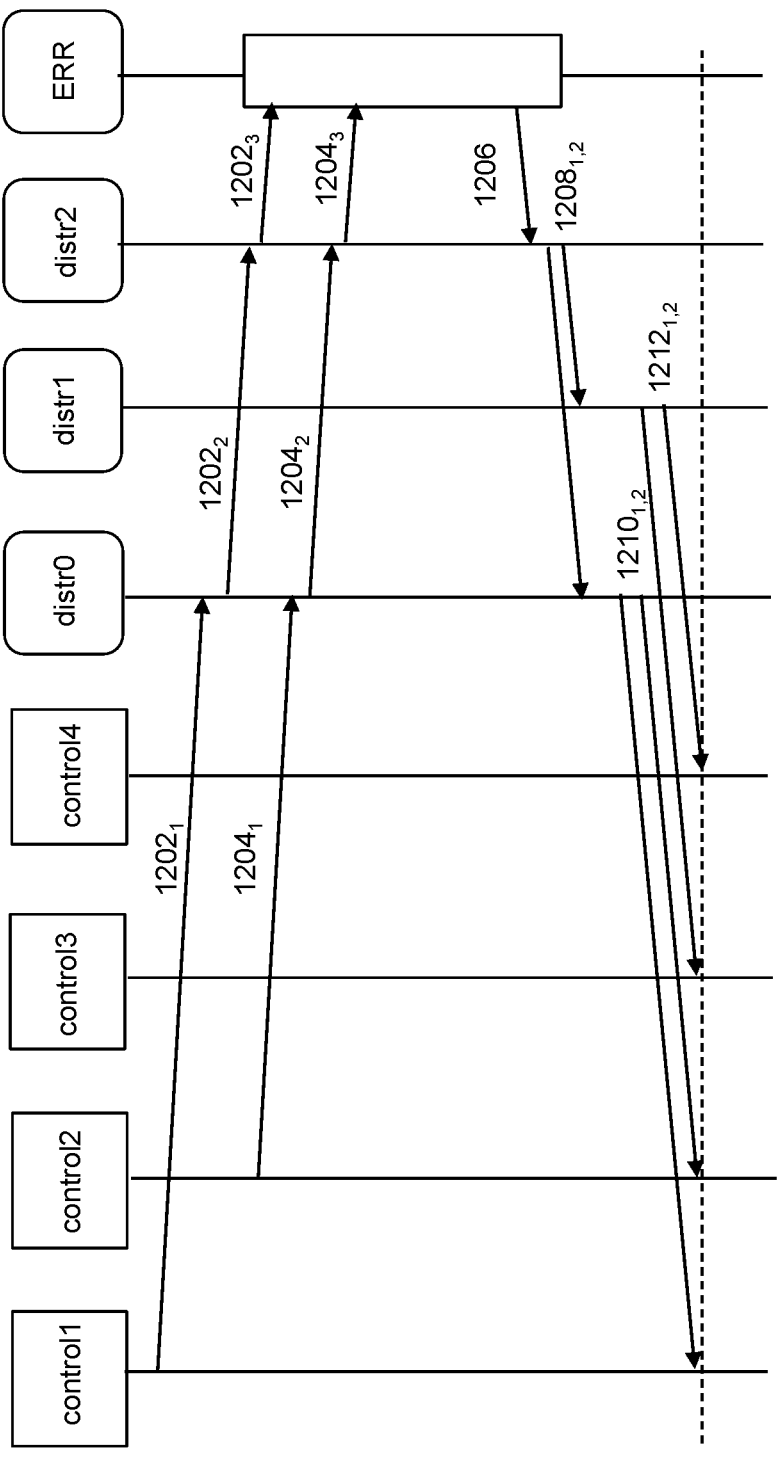
FIG. 12 depicts a flow diagram of a method for controlling data transmission in a network of data processing devices according to further embodiment of the invention.

To prevent the build-up of errors, the error correction cycle, the decoding and the transmission of data as depicted in FIG. 11B need to be performed as fast as possible. Minimizing latency in the transmission of the syndrome and distribution of the updated Pauli frame is therefore essential. In the architecture, the error decoder would naturally be placed close to the most central point of the network. This could for example be inside the FPGA that hosts the most central distributor or as a separate module connected to this distributor. FIG. 12 depicts a flow diagram of controlling messages in a network of data processing devices, which includes an error decoder. This figure illustrates transmission of ancilla qubit measurement data originating from two controllers $1206_{1,2}$, controller 1 and 2, via the local distributor $1202_2$ (distributor 0) and the root distributor $1202_1$ (distributor 2) to a quantum error decoder 1208. Thereafter, the result of the error decoding process 1206 may then be transmitted via the root and local distributors (transmissions $1208_{1,2}$) to the controllers (transmissions $1210_{1,2}$ and $1212_{1,2}$) such that all controllers receive the outcome of the quantum error decoding process exactly at the same time instance.

Thus, the scheme depicted in FIG. 12 illustrates that the content of the data message or messages sent to a distributor and the content of the data messages that are transmitted by the distributors to the controllers do not necessarily have to be the same, but can be result of a data processing step or scheme as e.g. the quantum error decoding process. It is noted that in the scheme depicted in FIG. 12, it is not always necessary to have the quantum error decoder connected to the root distributor. In other embodiments, a quantum error decoder may be connected to a local distributor. Further, as the quantum error decoder scheme needs to be executed as fast as possible, executing these processes may be prioritized by the arbitration function of the distributor.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A method for controlling data transmission in a hierarchical network of data processing devices, the data processing devices including quantum controllers for controlling quantum elements of a quantum computer and a distributor communicatively connected to the quantum controllers, each of the quantum controllers being configured to send analog signals to the quantum computer and to process analog signals received from the quantum computer, the method comprising:

receiving, by the distributor, a reference clock signal for synchronizing clocks of the data processing devices in the network;

synchronizing, by the distributor, a clock of the distributor based on the reference clock signal, so that the clock of the distributor is synchronized with the clocks of other data processing devices in the network; and, controlling, by the distributor, time-delayed transmission of a data message to the quantum controllers so that the data messages transmitted by the distributor arrive within a same clock cycle at at least part of the quantum controllers, the controlling time-delayed transmission by the distributor including configuring one or more delay elements based on a delay schedule including information about propagation delays associated with point-to-point connections between the distributor and the quantum controllers, the one or more delay elements being configured to forward a received data sage fter lapse of a configurable delay time.

2. The method according to claim 1 wherein the controlling by the distributor further includes:

receiving a first data message sent by a first quantum controller in the network; and, transmitting the first data message to the at least part of the quantum controllers based on the delay schedule.

3. The method according to claim 1 wherein the controlling by the distributor further includes:

receiving a first data message from a first quantum controller in the network, the first data message comprising one or more first data values;

transmitting the first data message to a further data processing device in the network, the further data processing device being configured to compute one or more second data values based on the one or more first data values;

receiving a second data message from the further data processing device comprising the one or more second data values; and, transmitting the second data message to at least part of the quantum controllers based on the delay schedule.

4. The method according to claim 1 wherein the synchronizing further includes:

triggering a timer to start counting based on the clock of the distributor, count values of the timer representing an absolute clock time for the distributor.

5. The method according to claim 1 wherein the distributor comprises a transceiver connected to data lines forming the point-to-point connections between the distributor and the quantum controllers, the transceiver including an input comprising input data lines and an output comprising output data lines.

6. Computer program product comprising software code portions configured for, when run in memory of a computer, executing the method according to claim 1.

7. The method according to claim 1 wherein the one or more delay elements being associated with an output of the distributor.

8. The method according to claim 2 wherein the controlling by the distributor further includes:

receiving a second data message sent by a second controller in the network, wherein the second data message is received by the distributor within the same clock cycle as the first data message;

transmitting the first and second data message to at least part of the quantum controllers based on the delay schedule, wherein an order in which the first data message and second data message are transmitted to the at least part of the quantum controllers is based on an arbitration scheme a random and/or priority scheduling.

9. The method according to claim 2 wherein the transmitting of the first data message is based on a broadcast transmission scheme or wherein the mission-oftransmitting of the first data message is based on a unicast or multicast scheme.

10. The method according to claim 3, wherein the further data processing device includes a quantum error decoder and the one or more first data values include error information associated with at least part of the quantum elements and the one or more second data values includes error correction information for correcting at least one error associated with the at least part of the quantum elements.

11. The method according to claim 9 wherein the transmitting of the first data message is based on the unicast or multicast scheme based on device addresses and a routing table comprising addresses of the data processing devices in the network.

12. The method according to claim 5 wherein the input data lines being associated with a buffer and/or the output data lines being associated with a delay element.

13. A method for controlling data transmission in a hierarchical network of data processing devices, the data processing devices including quantum controllers for controlling quantum elements of a quantum computer and distributors, each of the quantum controllers being configured to send analog signals to the quantum computer and to process analog signals received from the quantum computer, the method comprising:

receiving, by a first distributor, a reference clock signal for synchronizing clocks of the data processing devices in the network;

synchronizing, by the first distributor, a clock of the distributor based on the reference clock signal so that the clock of the first distributor is synchronized with the clocks of other data processing devices in the network; and, controlling, by the first distributor, time-delayed transmission of a data message to quantum controllers connected to the first distributor, the controlling including:

receiving a first data message from a second distributor, the second distributor having a network hierarchy that is higher than the network hierarchy of the first distributor; and, transmitting the first data message based on a delay schedule so that the transmitted first data messages arrive within the same clock cycle at the quantum controllers connected to the first distributor, the delay schedule including information about propagation delays associated with point-to-point connections between the first distributor and the quantum controllers connected to the first distributor.

14. The method according to claim 13 wherein the controlling further includes:

receiving a second data message from a quantum controller connected to the first distributor within the same clock cycle the first data message was received, wherein the second data message needs to be transmitted by the first distributor to at least part of the quantum controllers connected to the first distributor;

storing the second data message in a buffer for a period in which the first data message is transmitted on a basis of the delay schedule to the quantum controllers; and, transmitting the second data message to at least part of the quantum controllers connected to the first distributor.

15. The method according to claim 13 wherein at least one of the distributors forms a root of the hierarchical network, further distributors form nodes of the hierarchical network and the quantum controllers form leaves of the hierarchical network.

16. A method for configuring a distributor to control data transmission in a hierarchical network of synchronized data processing devices, the data processing devices including quantum controllers for controlling quantum elements of a quantum computer, each of the quantum controllers being configured to send analog signals to the quantum computer and to process analog signals received from the quantum computer, the method comprising:

transmitting by the distributor, at a transmission time instance, a time-logging message to the data processing devices, the distributor and the data processing devices being part of the hierarchical network of the synchronized data processing devices;

receiving from each data processing device information about an arrival time of the time-logging message at the respective data processing device;

determining a delay schedule based on the transmission time instance and arrival times, the delay schedule including information about propagation delays in data lines forming point-to-point connections between the distributor and the data processing devices;

configuring one or more delay elements associated with the data lines of the distributor based on the delay schedule so that data messages transmitted by the distributor via the data lines arrive within a same clock cycle at the data processing devices, the one or more delay elements being configured to forward a rece message after lapse of a configurable delay time.

17. A distributor apparatus for controlling data transmission in a hierarchical network of data processing devices, the data processing devices including quantum controllers for controlling quantum elements of a quantum computer and a distributor communicatively connected to the quantum controllers, each of the quantum controllers being configured to send analog signals to the quantum computer and to process analog signals received from the quantum computer, the distributor apparatus comprising:

a clock, a computer-readable storage medium having at least part of a program embodied therewith; and, a computer-readable storage medium having computer-readable program code embodied therewith, and a processor coupled to the computer-readable storage medium, wherein responsive to executing the computer-readable program code, the processor is configured to perform executable operations comprising:

receiving a reference clock signal for synchronizing clocks of the data processing devices in the network;

synchronizing the clock of the distributor apparatus based on the reference clock signal, so that the clock of the distributor is synchronized with the clocks of the quantum controllers; and, controlling time-delayed transmission of a data message to at least part of the quantum controllers so that the data messages transmitted by the distributor arrive within the same clock cycle at at least part of the quantum controllers, the controlling time-delayed transmission by the distributor including configuring one or more delay elements being-based on a delay schedule including information about propagation delays associated with point-to-point connections between the distributor and the quantum controllers, the one or more delay elements being configured to forward a received data message after lapse of a configurable delay time.

18. The distributor apparatus according to claim 17, wherein at least part of the distributor apparatus is configured as an FPGA or ASIC.

19. The distributor apparatus according to claim 17 further comprising an arbitration function configured to process data messages based on an arbitration scheme a random and/or priority scheduling and/or a routing function comprising a routing table including addresses of the data processing devices in the hierarchical network.

\* \* \* \* \*